US006295535B1

(12) United States Patent
Radcliffe et al.

(10) Patent No.: US 6,295,535 B1
(45) Date of Patent: Sep. 25, 2001

(54) METHOD AND SYSTEM FOR CREATING DESIGNS USING INTERNET-BASED AGENTS

(75) Inventors: Clark J. Radcliffe; Jon H. Sticklen, both of Okemos, MI (US)

(73) Assignee: Board of Trustees Operating Michigan State University, East Lansing, MI (US)

( * ) Notice: Subject to any disclaimer, the term of this patent is extended or adjusted under 35 U.S.C. 154(b) by 0 days.

(21) Appl. No.: 09/191,497

(22) Filed: Nov. 13, 1998

(51) Int. Cl.[7] .................................................. G06F 17/30

(52) U.S. Cl. ................................ 707/10; 707/3; 707/4; 707/5; 709/202; 709/219

(58) Field of Search ................................. 707/3, 4, 5, 10; 709/202, 219

(56) References Cited

U.S. PATENT DOCUMENTS

| | | | |
|---|---|---|---|
| 4,275,449 | 6/1981 | Aish | 364/512 |
| 4,951,192 | 8/1990 | Chase, Jr. et al. | 364/200 |
| 5,138,697 | 8/1992 | Yamamoto et al. | 395/120 |
| 5,272,642 | 12/1993 | Suzuki | 364/474.24 |
| 5,325,533 | 6/1994 | McInerney et al. | 395/700 |
| 5,339,435 | 8/1994 | Lubkin et al. | 395/700 |
| 5,406,846 | 4/1995 | Gasch et al. | 73/762 |
| 5,452,227 | 9/1995 | Kelsey et al. | 364/489 |
| 5,499,364 * | 3/1996 | Klein et al. | 709/202 |
| 5,557,730 | 9/1996 | Frid-Nielsen | 395/159 |
| 5,581,672 | 12/1996 | Letcher, Jr. | 395/120 |
| 5,649,105 | 7/1997 | Aldred et al. | 395/200.04 |
| 5,689,711 | 11/1997 | Bardasz et al. | 395/701 |
| 5,692,158 | 11/1997 | Degeneff et al. | 395/500 |
| 5,694,593 * | 12/1997 | Baclawski | 707/5 |
| 5,913,214 * | 6/1999 | Madnick et al. | 707/10 |
| 5,953,716 * | 9/1999 | Madnick et al. | 707/4 |
| 5,970,490 * | 10/1999 | Morgenstern | 707/10 |
| 6,038,668 * | 3/2000 | Chipman et al. | 713/201 |
| 6,049,819 * | 4/2000 | Buckle et al. | 709/202 |
| 6,065,039 * | 5/2000 | Paciorek | 709/202 |
| 6,092,099 * | 7/2000 | Irie et al. | 709/202 |
| 6,094,650 * | 7/2000 | Stoffel et al. | 707/3 |
| 6,144,989 * | 11/2000 | Hodjat et al. | 709/202 |
| 6,178,416 * | 1/2001 | Thompson et al. | 707/3 |
| 6,192,364 * | 2/2001 | Baclawski | 707/10 |

OTHER PUBLICATIONS

Etzioni, O. W., D. (1994) "A Softbot–Based Interface to the Internet," *Communications of the ACM* 37(7): 72–76.

(List continued on next page.)

*Primary Examiner*—Jean R. Homere
(74) *Attorney, Agent, or Firm*—Harness, Dickey & Pierce, P.L.C.

(57) ABSTRACT

An apparatus and method are provided for collaboratively generating characteristic data regarding at least one characteristic of a component. A querying ontological data structure is provided for structuring characteristic data transmitted across the network. A querying communicator which is connected to the network generates and structures based upon the querying ontological structure a first query which regards a first characteristic of the component and wherein the first query is to be sent across the network. The first component characteristic communicator which is connected to the network receives via the network the generated first query from the querying communicator. A first component characteristic determinator which is connected to the first characteristic communicator determines first characteristic data regarding the first characteristic of the component based upon the first query. The first characteristic communicator structures the determined first characteristic data based upon the querying ontological data structure and communicates the determined first characteristic data via the network. The system allows for a secure and standardized mechanism for computer engineering models to collaborate over a network in order to analyze engineering issues.

40 Claims, 8 Drawing Sheets

OTHER PUBLICATIONS

Franklin, S. a. G., A. (1996). "Is it an Agent, or just a Program: A Taxonomy for Autonomous Agents", Third Int'l Workshop on Agent Theories, Architectures, and Languages, Springer–Verlag.

Ginsberg, M.L. (1991). "Knowledge Interchange Format: The KIF of Death.", *AI Magazine*(Fall): 57–63.

Nwana, H.S. (1996). "Software Agents: An Overview." *The Knowledge Engineering Review* 11(3): 205–244.

Shoham, Y. (1997). An Overview of Agent–Oriented Programming. *Software Agents*. J. M. Bradshaw. Menlo Park, CA, AAAI Press: 271–290.

Sycara, K., Decker, K., Pannu, A., Williamson, M. Zeng, D. (1996). "Distributed Intelligent Agents." *IEEE Expert*-(Dec.).

Wooldridge, M. a J., N.R. (1995). "Intelligent Agents: Theory and Practice." *The Knowledge Engineering Review*10(2): 115–152.

* cited by examiner

METHOD AND SYSTEM FOR CREATING DESIGNS USING INTERNET-BASED AGENTS

BACKGROUND AND SUMMARY OF THE INVENTION

The present invention relates generally to computer-implemented engineering design systems. More particularly, the invention relates to computer-implemented networked engineering design systems.

Previous approaches to engineering modeling have been localized, non-proprietary and limited in the information available from the model. Whenever two engineering models were to be merged in order to provide greater analytical capability, typically one model's proprietary data and methods could be examined by the other model.

This exemplary disadvantage is particularly problematic when the models are from two different companies both striving to preserve the confidentiality of their respective proprietary modeling data and methods. Another exemplary disadvantage is that merging of the two models from two different developers so that the two models can communicate is difficult since the two models probably utilize two different input and output formats. This exemplary disadvantage grows even more problematic as the number of models to be merged increases.

SUMMARY OF THE INVENTION

In accordance with the teachings of the present invention, an apparatus and method are provided for collaboratively generating characteristic data regarding at least one characteristic of a component. A querying ontological data structure is provided for structuring characteristic data transmitted across the network. A querying communicator which is connected to the network generates and structures based upon the querying ontological structure a first query which regards a first characteristic of the component and wherein the first query is to be sent across the network. The first component characteristic communicator which is connected to the network receives via the network the generated first query from the querying communicator. A first component characteristic determinator which is connected to the first characteristic communicator determines first characteristic data regarding the first characteristic of the component based upon the first query. The first characteristic communicator structures the determined first characteristic data based upon the querying ontological data structure and communicates the determined first characteristic data via the network.

In an alternate embodiment, the present invention utilizes computer agent technology for determining the characteristic data. In this alternate embodiment, a computer agent encapsulates the characteristic determining data and methods in order to hide the data and methods from the querying communicator or any other remote entity connected to the network.

BRIEF DESCRIPTION OF THE DRAWINGS

Additional advantages and features of the present invention will become apparent from the subsequent description and the appended claims, taken in conjunction with the accompanying drawings in which:

FIG. 4b is a force analysis diagram depicting the spring system of FIG. 4a;

FIG. 5 is a software block diagram depicting the agents of the present invention for determining characteristics of the components of FIG. 4a;

FIG. 6a is a side-view of the first spring component of FIG. 4a;

FIG. 6b is a force analysis diagram for FIG. 6a;

FIG. 7 is a force analysis diagram for the attach join of FIG. 4a;

FIG. 8a is a side-view of the second spring component of FIG. 4a; and

FIG. 8b is a force analysis diagram of FIG. 8a.

DESCRIPTION OF THE PREFERRED EMBODIMENT

Figure 1:
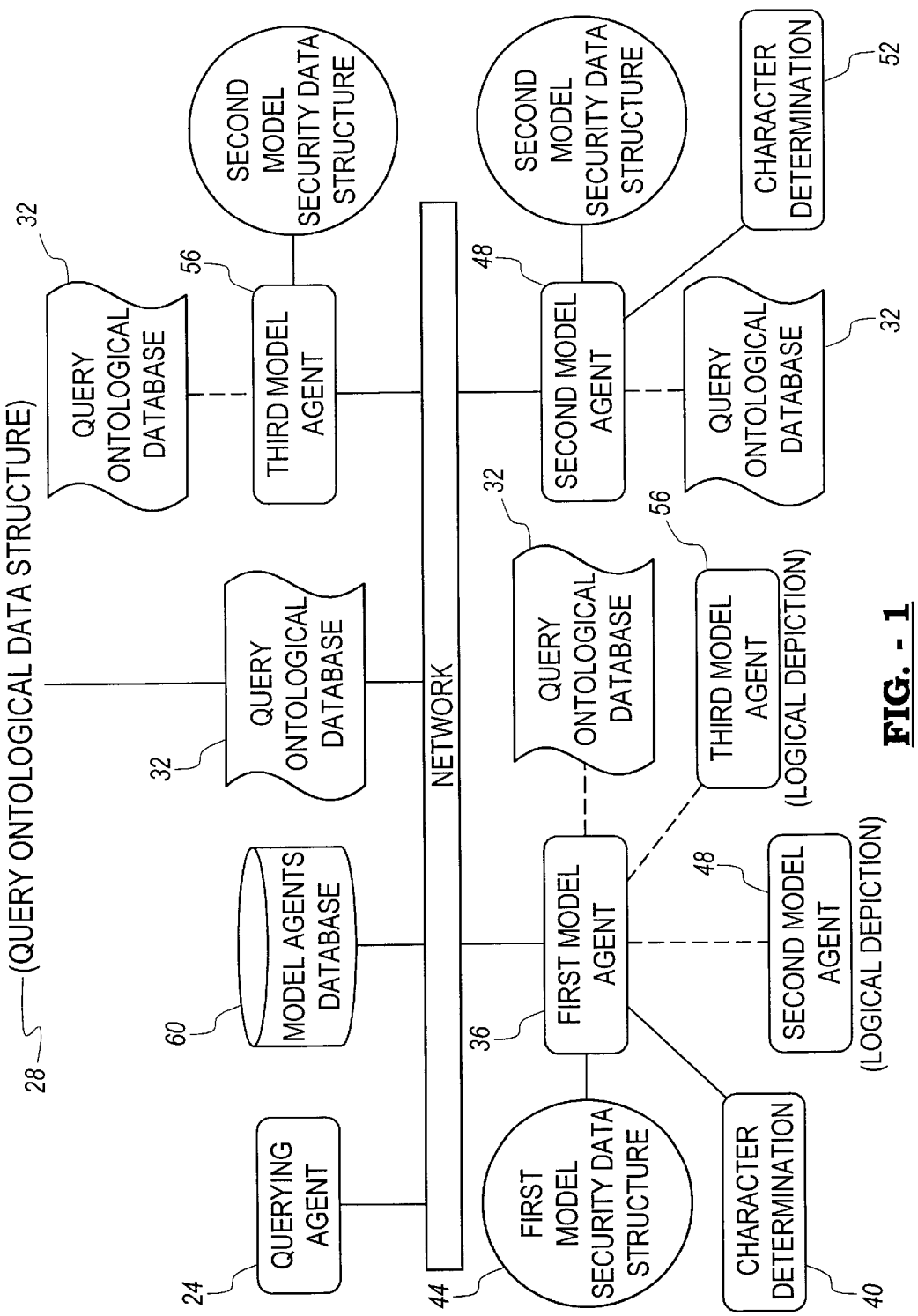
FIG. 1 is a network diagram illustrating an exemplary arrangement of computer-implemented component characteristic agents utilized to determine modeling data.

FIG. 1 depicts an exemplary arrangement of computer-implemented software modules which collaborate among each other in order to solve engineering and other types of design issues. Network 20 connects the engineering modeling modules so that they can exchange design solutions without revealing the proprietary methods and data by which they arrive at a solution.

Preferably, the computer modules are implemented with computer agent technology so that the computer agents have their own threads of control as well as the ability to encapsulate (i.e., hide) the data and methods by which the computer agents arrive at the solutions. However, it is to be understood that the present invention is not limited to an agent computer technology, but rather extends to other object-oriented computer implementations as well as more traditional computer implementations such as, but not limited to, FORTRAN or C.

The present invention includes a querying agent 24 which inquires from other agents on network 20 as to whether they can provide a solution to a particular design question. Querying agent 24 structures the request in accordance with a querying ontological data structure 28 which is stored in a query ontological database 32. Query ontological data structure 28 facilitates the standardization of modeling data exchange among the agents on network 20.

The modeling results from the agents are available in the form of responses to standard types of engineering questions chosen from an ontology of possible questions. One form of standard question types include model physical responses such as structural, dynamic, mechanical, or temperature responses. Other forms of questions include design intent queries (i.e., what types of solutions does a particular model agent provide), and economic characteristic queries.

Querying agent 24 initially uses the design intent query from the query ontological data structure 28 in order to determine which model agents on network 20 are able to address a particular engineering issue. For example, querying agent 24 may issue a design intent query which requests which agents on network 20 can perform a two span bridge load analysis. In this example, a first model agent 36 is able to provide such an analysis. Accordingly, first model agent 36 communicates to querying agent 24 over network 20 that it can provide such an analysis.

Thereupon, querying agent 24 supplies the data needed for the load analysis to be performed. Querying agent 24 structures this data according to the format specified in the query ontological data structure 28. Since first model agent 36 has access to query ontological data structure 28 due to its connection with network 20, first model agent 36 knows the format and structure of the data which querying agent 24 is providing. In the preferred embodiment, first model agent 36 maintains a copy of query ontological database 32 on the computer on which first model agent 36 resides.

As a non-limiting example, the querying agent 24 may provide the following query to first model agent 36: whether a two span bridge would buckle under the weight of five hundred cars wherein the bridge has certain predetermined physical characteristics (such as, made out of steel and with a certain length). First model agent 36 receives this request and forwards the data to a component characteristic determinator agent.

Component determinator agent 40 has preferably encapsulated via standard object-oriented techniques its data and methods by which it performs the two span bridge load analysis. Through the encapsulation technique, the characteristic determining data and methods by which component characteristic determinator agent 40 operates are hidden from entities remotely located on network 20 such as querying agent 24.

Additional security measures are employed in alternate embodiments of the present invention in order to provide additional levels of security regarding the internal data and methods of the model agents on the network. For example, model security data structures are employed in this alternate embodiment and used by the model agents in order to better determine who on the network is permitted to see the internal data and methods. Accordingly, first model agent 36 utilizes a first model security data structure 44 in order to determine whether querying agent 24 is allowed access to the internal data and methods of component characteristic determinator agent 40.

The present invention with its standardized query ontological data structure 28 and the security measures allows multiple model agents to respond to the same request. For example, a second model agent 48 can be provided at a remote site and connected to network 20 for providing responses to two span bridge load queries. Second model agent 48 has preferably the query ontological database 32 resident on the computer on which second model agent 48 operates. In this way, second model agent 48 and querying agent 24 have a structured mechanism for exchanging data. Moreover, second model agent 48 includes component characteristic determinator agent 52 in order to perform the detailed two span bridge load analysis. The component agent 52 of second model agent 48, in this example, utilizes a different engineering analysis technique than the component agent 40 of first model agent 36.

Within an exemplary customer-supplier context, a customer can execute querying agent 24 to initiate a request across the network as to what is the cost associated with providing a bridge across a predetermined distance which can withstand the weight of five hundred cars. The automated first model agent 36 of a first supplier utilizes its determinator agent 40 in order to provide the first supplier's cost to provide such a bridge. A second supplier's second model agent 48 utilizes its own determinator agent 52 in order to provide possibly a lower cost to construct such a bridge. The querying agent 24 of the customer analyzes the responses from the model agents of the two suppliers in order to select the better offer between the two suppliers without knowing the respective supplier's proprietary information and methods for determining the cost for supplying such a bridge.

The present invention also provides in the preferred embodiment, mechanisms for model agents to communicate among themselves in a secure standardized fashion. In this way, a model agent can utilize the resources of other model agents to answer questions which are needed for the model agent to properly respond to a querying agent.

For example, first model agent 36 can utilize its own component characteristic determinator agent 40 in order to provide structural bridge load analysis to answer in part the request by querying agent 24. First model agent 36 can then query a third model agent 56 to provide cost analysis for the bridge structure determined by determinator agent 40. Third model agent 56 preferably includes on a computer on which it operates a local copy of query ontological database 32 in order to communicate in a standard fashion with first model agent 36.

The present invention also includes first model agent querying multiple model agents on network 20 which can provide cost analysis for bridge structures. For example, first model agent 36 can send out a cost analysis query across network 20 and receive cost analysis responses from three different model agents. Thereupon, in this non-limiting example, first model agent 36 can average the three cost responses in order to provide a more reliable cost estimate to querying agent 24. Alternatively, first model agent 36 in this example can ignore a cost estimate from a model agent if that cost estimate is statistically too far removed from the other two cost estimates.

Moreover, the present invention also includes the third model agent 56 sending its own queries across network 20 in order to assist in providing cost estimates. Since the present invention can be utilized on the Internet (i.e., global computer networks connected by common protocol) as well as in a local area network, querying agents can locate multiple sources for providing answers to their requests. Accordingly, the present invention allows for a "freer and richer" flow of information among many remotely located computer entities while protecting the proprietary internal data and methods of the computer entities.

To assist the querying agent 24 to locate those model agents which can address a certain issue, the present invention provides a model agent database 60. Model agent database 60 includes in the preferred embodiment an association among the following items of information: which model agents can answer which queries and where on network 20 are they located. In one embodiment of the present invention, computerized Internet web crawlers can scan the Internet for model agents and interrogate from them to what queries can they respond.

Figure 2:
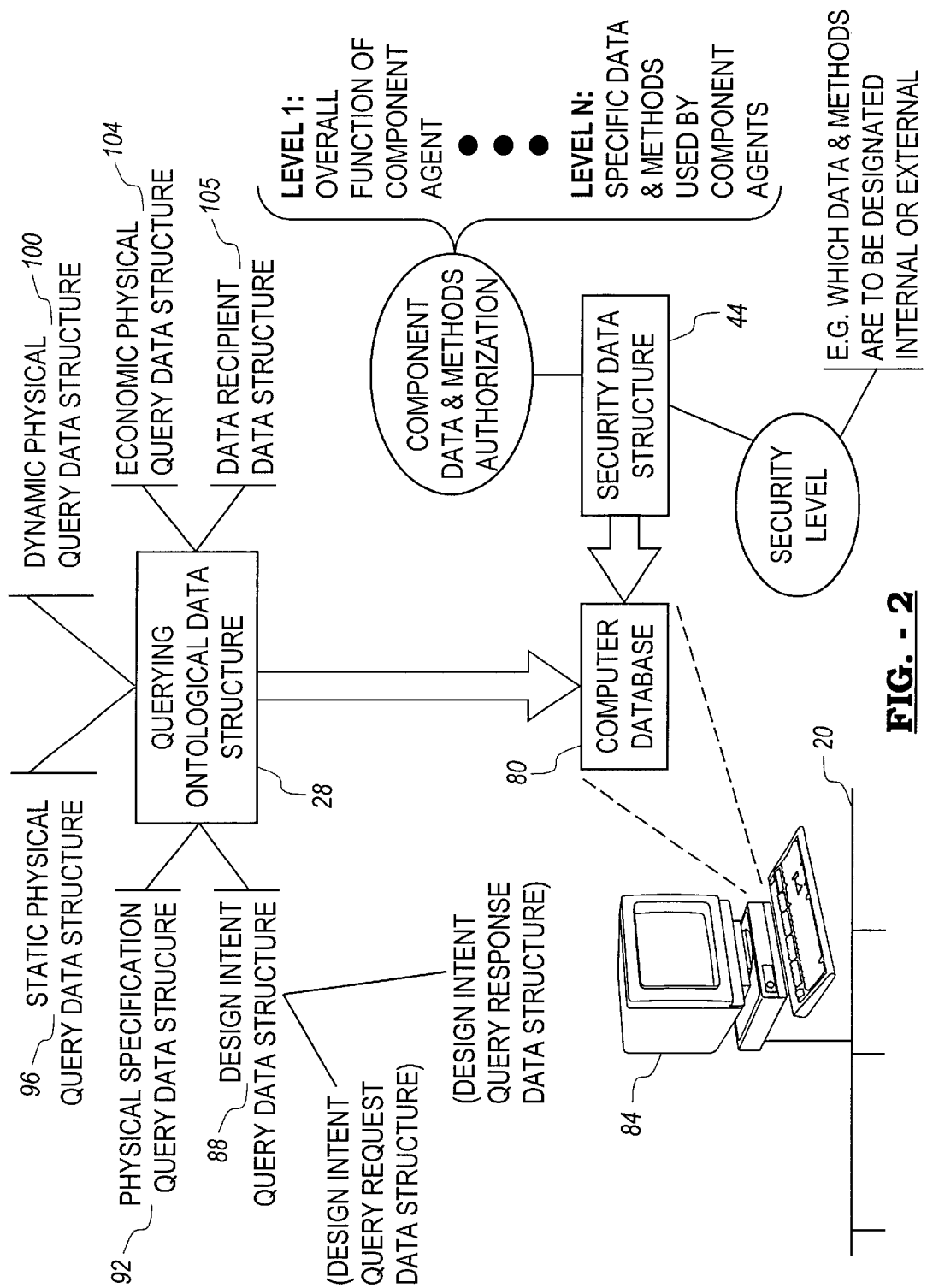
FIG. 2 is a data structure hierarchy diagram depicting the data structures utilized within the present invention.

FIG. 2 depicts several of the data structures utilized by the present invention; a querying ontological data structure 28 and security data structure 44. Querying ontological data structure 28 and security data structure 44 are preferably contained within database 80 of a computer 84 which is connected to network 20.

Querying ontological data structure 28 includes those data structures used to generate queries or used to structure responses. Querying ontological data structure 28 can include for a computer agent: a design intent query data structure 88; a physical specification query data structure 92; a static physical query data structure 96; a dynamic physical query data structure 100; economic query data structure 104; and a data recipient data structure 105.

A data intent query data structure 88 is utilized by a querying agent to structure a query to a model agent as to what types of questions can a model agent respond.

Accordingly, design intent query data structure 88 includes a request design intent query data structure so that the querying agent can formulate such a query. Correspondingly, design intent query structure 88 includes a response design intent query data structure so that the model agent knows how to format the response to a design intent query request by a querying agent.

A physical specification query data structure 92 is utilized by a querying agent to specify physical parameters and economic parameters to be used by the model agents in order to perform their analysis. For example, a physical specification query data structure for the two span bridge load analysis might include the length of the distance to be spanned by the bridge and its units as well as the width of the bridge and its units and furthermore that the cost does not exceed three million dollars.

A static physical query data structure 96 is utilized by model agents in order to structure their answers regarding static physical queries sent by querying agents. For example, a static physical query data structure 96 may include the data format and the units of the static physical properties which are in response to a static physical issue to be provided to the querying agent by the model agent. Such static physical issues include, but are not limited to, forces and tensions exerted on each member of a two span bridge.

The dynamic physical query data structure 100 is utilized by model agents in order to structure responses regarding dynamic physical responses to be provided to a querying agent. Such dynamic physical responses include for example, but are not limited to, thermal distribution of a steel bridge throughout an average summer day in California on an hourly basis.

Economic query data structure 104 indicates to model agents how economic data is to be provided to a querying agent For example, an economic query data structure 104 may include, but is not limited to, a response amount as well as the unit of currency of the amount.

Data recipient data structure 105 is utilized in the preferred embodiment by a querying agent in order to specify to a model agent that the answer to a modeling question should be sent to an entity or entities other than the requesting querying agent. Data recipient data structure 105 includes identification information related to the desired recipient(s) of the model agent's answers (such as, but not limited to, locations on the Internet of the desired recipients).

It should be understood that the present invention is not limited to only engineering technical model issues but encompasses models and the ability to provide results regarding issues from many different areas and disciplines. For example, the present invention may be utilized to address societal issues such as population growth issues or linguistic issues such as determining the parts of speech for each word provided in an input sentence.

Security data structure 44 is utilized in an alternate embodiment of the present invention in order to provide additional layers of protection for the internal data and methods used by the model agents. Security data structure 44 includes data regarding which entities may access which levels of data and methods of the model agents and their respective component agents. For example, all querying agents on the Internet may be authorized to receive information about level one information regarding the overall function of a model agent. However, only certain predetermined querying agents may be authorized based upon their identification and a password to receive lower level detailed information about the data and methods used by a model agent's component agents.

In still another alternate embodiment, security data structure 44 utilizes a security level approach wherein data and methods are designated as internal or external relative to a model agent. Those data methods designated as internal are not provided to querying agents whereas those designated as external are provided to querying agents.

Figure 3:
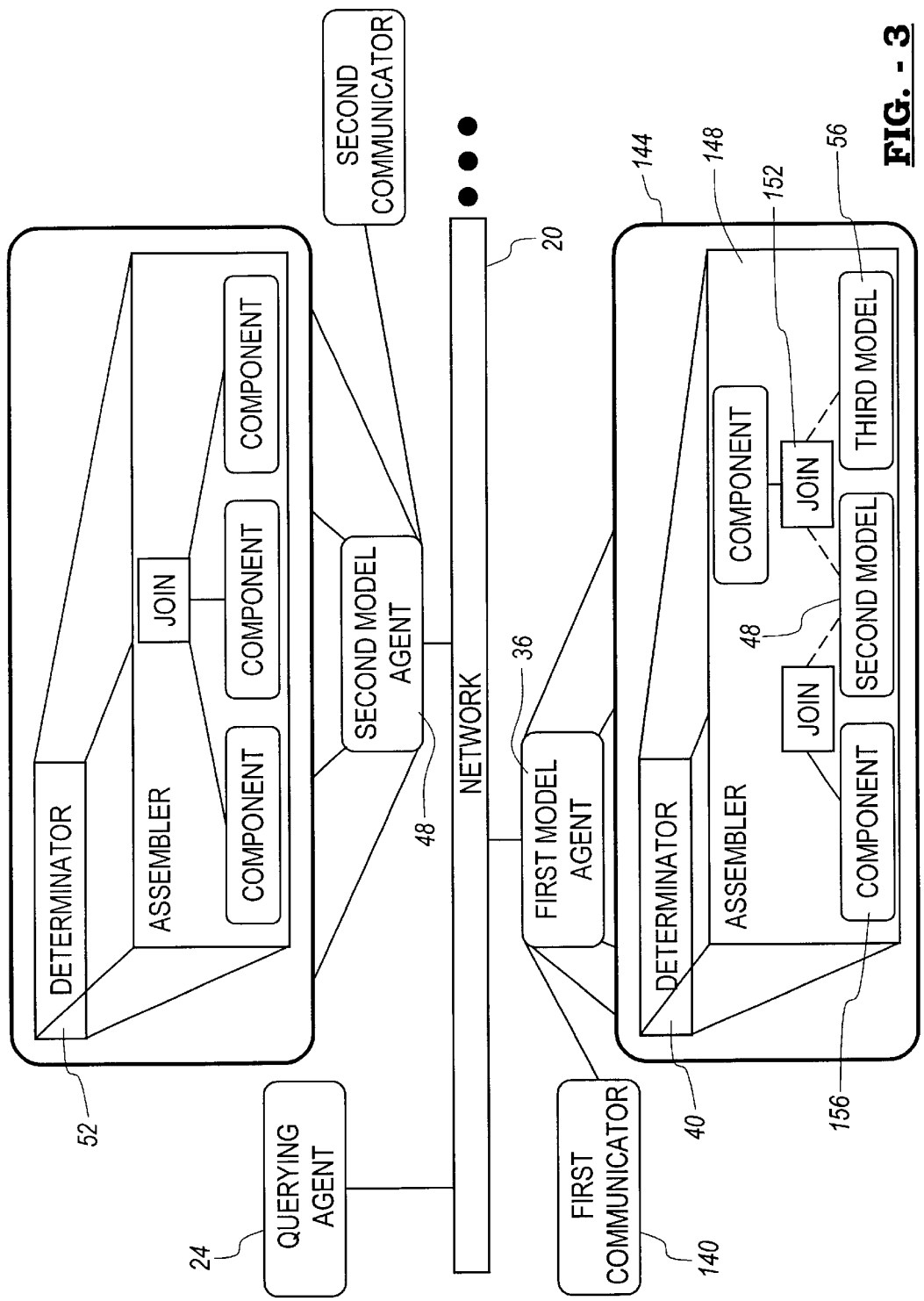
FIG. 3 is a software decomposition diagram which depicts an exemplary decomposition of a model agent.

With reference to FIG. 3, software agents within the present invention can be implemented either as self-contained software agents or a linked set of further decomposable agents, all linked over the Internet. The preferred embodiment of the present invention includes a separation of the functions of the model agents such as the communication aspect of the model agent being separate from the characteristic determination functionality of the model agent. For example, first model agent 36 includes a first communicator 140 for providing communication between querying agent 24 and component characteristic determiner agent 40. This separation between first communicator 140 and determinator agent 40 is preferably achieved through standard object-oriented encapsulation techniques as shown by reference numeral 144.

Determinator agent 40 preferably is implemented as a software object-oriented structure involving assembler agent 148, join agent 152, and component agents 156. Assembler agent 148 maintains the consistency of a model by controlling the joint agents 152 which connect causally standardized model component agents 156 and subsystem model agents. Within the example of FIG. 3, subsystem model agents constitute second model agent 48 and third model agent 56 since determinator agent 40 utilizes in this example the analysis techniques provided by second model agent 48 and third model agent 56 in order for first model agent 36 to provide a response to querying agent 24.

It should be understood, however, that while FIG. 3 depicts second model agent 48 and third model agent 56 within the structure of determinator agent 40 this is a functional depiction in that physically the second model agent 48 and the third model agent 56 operate "outside" of first model agent 36 (i.e., they operate on remote computers).

Moreover, it should be understood that the present invention also includes recursion such that a model agent can "call" itself. For example, the present invention includes third model agent 56 being representative of first model agent 36 where first model agent 36 has called itself in order to perform a function.

The decomposable structure of the present invention allows further distribution of the modeling process across network agents of the modeled system. Once developed and published on the Internet as an independent model agent, a model agent is available as a subsystem model agent which can be assembled into higher level engineering models.

Within the preferred embodiment, model agents provide answers to standardized questions as well as provide connection interfaces to other model agents on the network. Assembler agents 148 manage the characteristic determination analysis and the constituent subsystem models, component agents and join agents. Assembler agents 148 receive questions submitted to the model agents and administer the submission of questions to model subsystem agents and component agents. Moreover, the assembler agents 148 assemble the answers from the model subsystem agents and component agents into model answers.

Joint agents 152 connect component agents 156 in order to assure geometric, causal, and performance consistency at the subsystem-to-subsystem connection level. Component agents 156 are low-level objects which provide answers to such questions as geometric, performance, economic, appearance, design-intent, physical specification, and other questions. Component agents 156 also include the ability to generate connection ports at which models are connected by joins of more complex, multi-component models.

Figure 4B:
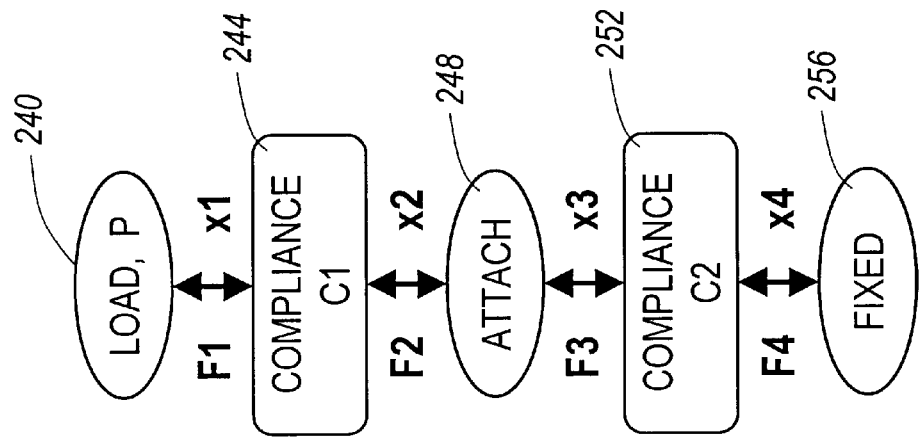
Figure 4A:
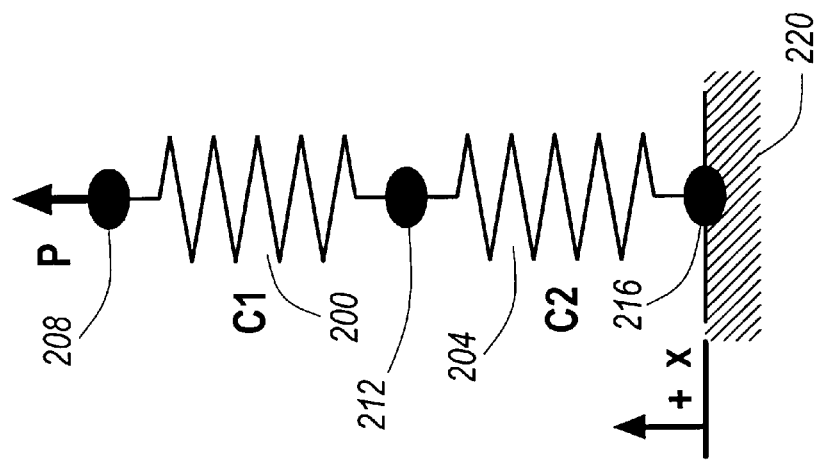
FIG. 4a is a side-view of two springs under a load.

FIGS. 4a–8b comprise an example to depict the preferred embodiment for the agent structure of a characteristic determinator agent. With reference to FIG. 4a, a two spring component physical system is to be analyzed by the present invention. FIG. 4a depicts a first spring 200 and a second spring 204 which is being pulled by a load "P" 208. The two springs are attached together at an attachment point 212, and the second spring 204 is fixed at point 216 to a base 220.

FIG. 4b is a force analysis diagram corresponding to the two spring physical system of FIG. 4a. Load node 240 of FIG. 4b corresponds to load 208 of FIG. 4a. The compliance of the first spring is represented in FIG. 4b by first compliance node 244. Compliance denotes the ability of an object to yield elastically when a force is applied to the object. The compliance of the second spring is represented as the second compliance node 452. Attached node 248 represents the attachment point between the first and second springs. Fixed node 256 represents the point at which the second spring is fixed to the base.

The purpose of the model of FIG. 4b is to show the interrelationships better the load and springs and how the two springs act with respect to compliance when a load P is applied to the springs.

Figure 5:
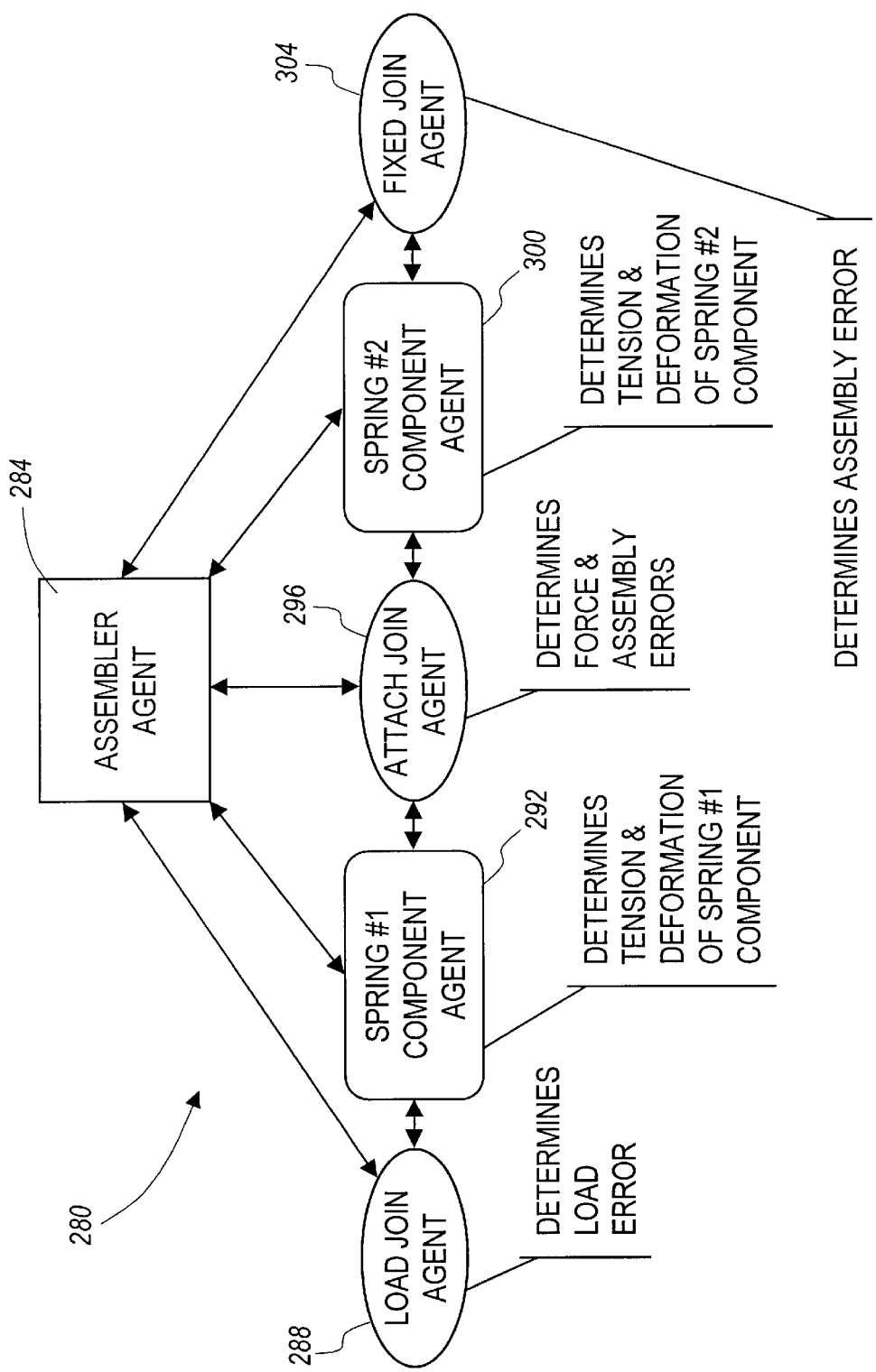
Figure 6B:
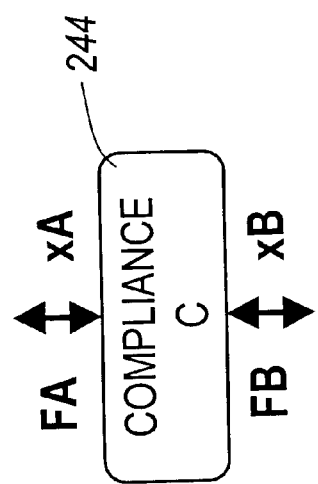
Figure 6A:
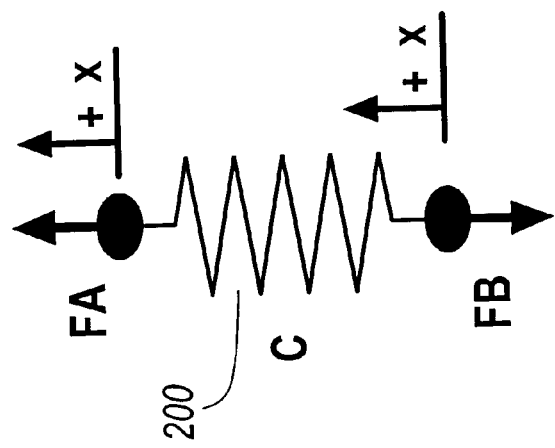
Figure 7:
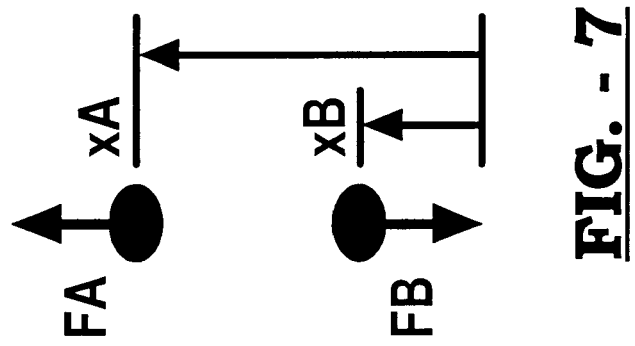

FIG. 5 is an exemplary implementation of the present invention to model the two spring system of FIGS. 4a and 4b and to determine answers regarding the physical characteristics of tension and deformation of the two springs. FIG. 5 depicts a spring characteristic determinator agent 280. Spring characteristic determinator agent 280 includes an assembler agent, join agents, and component agents in order to model and to provide information regarding the two spring system.

Assembler agent 284 manages the flow of information into and out of the spring characteristic determinator agent 280. Load join agent 288 depicts the load of the two spring system. First and second component agents 292 and 300 are the computer agents responsible for modeling the behavior of the two springs in this example. Attach join agent 296 models the attachment point between the two springs. Fixed join agent 304 models the point at which the two spring system is joined to the base.

In this example, a querying agent provides to spring model determinator agent 280 the following information in order to learn spring deflection and tension characteristics:

Load, P=100 pounds
Fixed End Coordinate, Xf=1 foot
Spring #1:
Compliance, C1=0.001 feet per pound
Nominal Length, L1=2.5 feet
Spring #2:
Compliance, C2=0.0001 feet per pound
Nominal Length, L2=2.0 feet The determinator 280 passes to its assembler agent 284 the above externally defined data. The function of the assembler agent 284 is to find spring displacements that both allow assembly of an internally consistent model topology with minimum model agent error. The discussion below uses the input-output functional notation a=b(c,d, . . . ) to indicate output data resulting from application of an analysis function. Any appropriate analysis function b could be substituted using input data (c,d, . . . ) to form output data a.

To start the process in this non-limiting example, the assembler agent makes an initial estimation of the remaining free input data required for the component agents (244 and 252) and join agents (240, 248 and 256) in the model:

From Model Topology:
Spring #1 Center Position, Xc1=L2+L1/2=3.25 feet (no deflection information);
Spring #2 Center Position, Xc2=L2/2=1.0 foot (no deflection information).
Remaining Data:
Attach Joint Force, Fa=0 pounds (no information)
Fixed Joint Force, Ff=0 pounds (no information)

The Assembler agent 284 then provides to agents 288, 292, 296, 300, and 304 the data required for them to respond:

To Load Join Agent 288:
Load, P
To Spring #1 Component Agent 292:
Spring #1 Nominal Position, Xc1=L2+L1/2=3.25 feet
Compliance, C1=0.001 feet per pound
Nominal Length, L1=2.5 feet
To Attach Join Agent, 296:
Attach Joint Force, Fa=0 pounds
To Spring #2 Component Agent 300:
Spring #2 Nominal Position, Xc2=L2/2=1.0 foot
Compliance, C2=0.0001 feet per pound
Nominal Length, L2=2.0 feet
To Fixed Join Agent 304:
Fixed Joint Force, Ff=0 pounds
Fixed Joint Position, Xf=1 foot Join Agents (288, 296, and 304) then respond to connected component agents (292 and 300) with internally programmed responses based on the data provided by the assembler 284.

From Load Join Agent 288:
to Spring Component #1 Agent 292: Force input A, FA1=P
From Attach Join Agent, 296:
to Spring Component #1 Agent 292: Force input B, FB1=0 pounds
to Spring Component #2 Agent 300: Force input A, FA2=0 pounds
From Fixed Join Agent 304:
to Spring Component #2 Agent 300: Force input B, FB2=0 pounds Component Agents (292 and 300) then respond to connected join agents (288, 296, and 304) and the assembler agent 284 with internally programmed responses based on the data provided by the assembler 284 and the join agents (288, 296, and 304).

From Spring #1 Component Agent 292:
to Load Join Agent 288:
end deflection, XA1=fCA(C1,L1,Xc1,FA1,FB1)= Xc1+[(FA1+FB1)*C1*L1]/4
to Attach Join Agent 296:
end deflection, XB1=fCB(C1,L1,Xc1,FA1,FB1)=Xc1− [(FA1+FB1)*C1*L1]/4
to Assembler Agent 284:
static force error, EC1=fEC(FA1,FB1)=FA1−FB1
From Spring #2 Component Agent 300:
to Attach Join Agent 296:

end deflection, XA2=fCA(C2,L2,Xc2,FA2,FB2)=
    Xc2+[(FA2+FB2)*C2*L2]/4
to Fixed Join Agent 304:
    end deflection, XB2=fCB(C2,L2,Xc2,FA2,FB2)=Xc2−
        [(FA2+FB2)*C2*L2]/4
to Assembler Agent 284:
    static force error, EC2=fEC(FA2,FB2)=FA2−FB2
Join Agents (288, 296, and 304) then respond to the assembler agent 284 with internally programmed responses based on the data provided by the assembler 284 and the component agents (292 and 300).
From Load Join Agent, 288:
    to assembler agent 284:
        load displacement error, Edl=Edl(XA1)=0 (Any displacement is acceptable)
From Attach Join Agent, 296:
    to assembler agent 284:
        attach displacement error, Eda=Eda(XB1,XA2)=XB1−XA2
From Fixed Join Agent 304:
    to assembler agent 284:
        fixed displacement error, Edf=Edf(XB2,)=XB2−Xf The assembler agent 284 then uses the error responses from the component and join agents to form new estimates of the free data Xc1, Xc2, Fa and Ff. These estimates are formed in an iterative process so that the agent errors (EC1, EC2, Edl, Eda, and Edf) are reduced to an acceptable level. There are numerous computer methods available to the assembler to iteratively minimize an error function of this form. Once the assembler 284 minimizes the agent errors, the minimum error response of the components (292 and 300) and joins (288, 296, and 304) may be returned by the assembler 284 to the determinator 280. This example demonstrates the standard input/output structure used in the network agent based implementation of the invention.

FIGS. 6a–8b depict graphically the agents involved in the above example. First spring component agent 292 models in the manner described above the system shown in FIGS. 6a and 6b. Attach join agent 296 models in the manner described above the system of FIG. 7 and in particular the forces and measurement errors associated with the attachment point between the two springs. Second spring component agent 300 models in the manner described above the systems depicted in FIGS. 8a and 8b.

Figure 8B:
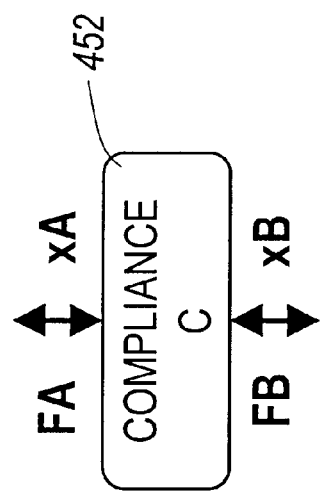
Figure 8A:
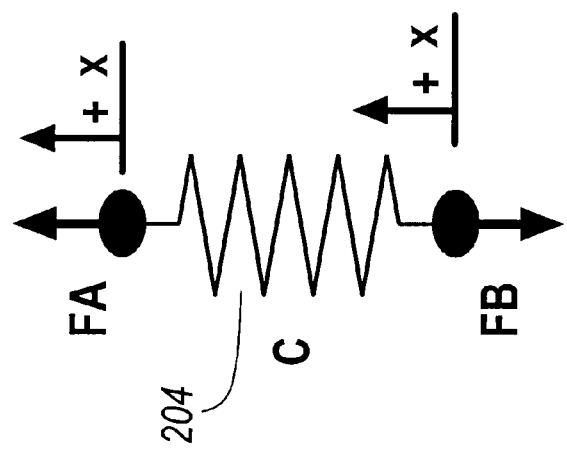

It should be noted that in this non-limiting example, spring component agents 292 or 300 can be represented diagrammatically by the elements shown in FIGS. 8a and 8b. In such respects, the recursive aspect of the present invention as described above can be used to perform the functionality of spring components agent 292 and 300.

With such a system as shown exemplarily in FIG. 3, the present invention provides, among other things, a secure and standardized mechanism for computerized engineering models to collaborate over a network in order to analyze engineering issues.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

It is claimed:

1. A networked computer-implemented system for determining collaboratively via a computer network characteristic data regarding at least one characteristic of a physical object, comprising:

an ontology of queries for structuring data transmitted across the network regarding the characteristics of the physical object;

a query communicator connected to the network for generating and structuring based on the ontology of queries, a first query regarding a first characteristic of the physical object to be sent across the network;

a first model agent having;

a first physical object characteristic communicator connected to the network for receiving via the network the generated first query from the query communicator;

a first physical object characteristic determinator connected to the first physical object communicator for determining first characteristic data regarding the first characteristic of the physical object based upon the first query, the first characteristic communicator structuring the determined first characteristic data based upon the ontology of queries and communicating the determined first characteristic data via the network;

at least one join function for managing data collection from at least one external location on the network; and a first assembler function connected to the join function and the first physical object characteristic communicator for providing the first query to the join function from the first physical object characteristic communicator and for receiving the determined first physical characteristic from the join function.

2. The networked computer-implemented system of claim 1 wherein said first physical object characteristic determinator contains characteristic determining data and methods for determining said first characteristic data, said first physical object characteristic determinator encapsulating said characteristic determining data and methods in order to hide said characteristic determining data and methods from said query communicator.

3. The networked computer-implemented system of claim 1 wherein said first model agent has its own process thread and contains characteristic determining data and methods for determining said first characteristic data, said first agent encapsulating said characteristic determining data and methods in order to hide said characteristic determining data and methods from said query communicator.

4. The networked computer-implemented system of claim 1 wherein said first physical object characteristic communicator contains information related to the data and methods used by said first physical object characteristic determinator to determine said characteristic data, said system further comprising:

a security data structure connected to said first physical object characteristic communicator for indicating which information related to said data and methods used by said first physical object characteristic determinator are to be provided to said query communicator by said first physical object characteristic communicator, said characteristic data being at various levels of detail regarding said first physical characteristic, wherein said security data structure further indicates which levels of detail of said characteristic data and which information related to said data and methods of said physical object characteristic determinator are to be provided based upon the type of requesting query agent.

5. The networked computer-implemented system of claim 1 wherein said ontology of queries includes queries being selected from the group consisting of design intent queries, physical specification queries, static physical response queries, dynamic physical response queries, economic characteristic queries, and combinations thereof.

6. The networked computer-implemented system of claim 5 wherein said ontology of queries includes the format of the queries allowed by said first physical object characteristic communicator.

7. The networked computer-implemented system of claim 5 wherein said ontology of queries includes the format of the response expected from said first physical object characteristic communicator.

8. The networked computer-implemented system of claim 1 further comprising:
   a second characteristic communicator connected to said network and to said ontology of queries for receiving a second query from said query communicator via said network, said second characteristic communicator structuring a response whose format and content is compatible with said query ontological data structure; and
   a second physical object characteristic determinator connected to said second characteristic communicator for determining based upon said second query second characteristic data regarding a second characteristic of said physical object,
   said second characteristic communicator structuring said determined second characteristic data using said ontology of queries for providing said determined second characteristic data to said query communicator via said network.

9. The networked computer-implemented system of claim 8 wherein said characteristic data is indicative of characteristics of said physical object being selected from the group consisting of design intent queries, physical specification queries, static physical response queries, dynamic physical response queries, economic characteristic queries, and combinations thereof.

10. The networked computer-implemented system of claim 1 further comprising:
    a second characteristic communicator connected to said network and to said ontology of queries for receiving a second query from said first physical object characteristic communicator via said network regarding a second characteristic of said physical object, said second characteristic communicator structuring a response to said second query based upon said query ontological data structure; and
    a second physical object characteristic determinator connected to said second characteristic communicator for determining based upon said second query said second characteristic data,
    said second characteristic communicator structuring said determined second characteristic data using said ontology of queries for providing said determined second characteristic data to said first physical object characteristic communicator via said network.

11. The networked computer-implemented system of claim 10 wherein said ontology of queries includes queries being selected from the group consisting of design intent queries, physical specification queries, static physical response queries, dynamic physical response queries, economic characteristic queries, and combinations thereof.

12. The networked computer-implemented system of claim 1 wherein said first characteristic data is indicative of characteristics of said physical object being selected from the group consisting of static physical characteristics, dynamic physical characteristics, economic characteristics, and combinations thereof.

13. The networked computer-implemented system of claim 1 further comprising:
    a second characteristic communicator connected to said network for receiving said first query from said query communicator via said network, said second characteristic communicator structuring a response to said first query based upon said query ontological data structure; and
    a second physical object characteristic determinator connected to said second characteristic determinator for determining first characteristic data regarding said first characteristic of said physical object based upon said first query,
    said second characteristic communicator structuring said first characteristic data determined by said second physical object characteristic determinator based upon said ontology of queries for providing said first characteristic data as determined by said second physical object characteristic determinator to said query communicator via said network.

14. The networked computer-implemented system of claim 13 wherein said characteristic data is indicative of characteristics of said physical object being selected from the group consisting of static physical characteristics, dynamic physical characteristics, economic characteristics, and combinations thereof.

15. The networked computer-implemented system of claim 1 wherein said network includes a global communication network communicating via common protocols.

16. The networked computer-implemented system of claim 15 wherein said network includes communication over the internet, said common protocols including TCP/IP.

17. The networked computer-implemented system of claim 1 wherein said query includes data indicative of a recipient model agent, said first physical object characteristic communicator providing said determined first characteristic data only to said recipient model agent.

18. The networked computer-implemented system of claim 1 further comprising:
    a database accessible via said network for providing available model agents to be queried by said query communicator, said first physical object characteristic communicator being selected by said query communicator via said database.

19. The networked computer-implemented system of claim 1 wherein said first model agent is assembled with a second model agent, said second model agent having:
    a plurality of second physical object agents for determining second characteristic data based upon said first query;
    at least one join agent for managing the data exchange between the first and second model agents;
    a second assembler agent connected to said second model agent and to said join agent for providing data from said first model agent to said join agent and for receiving said determined first characteristic data from said physical object agents via said join agent.

20. The networked computer-inplemented system of claim 19 further comprising:
    a database accessible via said network for listing available model agents, said second model agent being selected by said first model agent via said database for being assembled with one of said first join agents into said first model agent.

21. The networked computer-implemented system of claim 1 wherein said first physical object characteristic determinator recursively invokes itself in order to determine said first characteristic data.

22. A networked computer-implemented method for determining collaboratively via a computer network characteristic data regarding at least one characteristic of an object, comprising:
   structuring via an ontology of questions data to be transmitted across said network, said ontology of questions regarding said characteristics of said object;
   generating and structuring based upon said ontology of questions a first query regarding a first characteristic of said object to be sent across said network;
   receiving via said network said generated first query;
   determining first characteristic data regarding said first characteristic of said object based upon said first query;
   structuring said determined first characteristic data based upon said ontology of questions and communicating said determined first characteristic data via said network;
   using a plurality of first object agents for determining said first characteristic data based upon said first query;
   using at least one join agent for managing the data exchange between said first physical object agents; and
   using a first assembler agent connected to said first characteristic agent and to said first join agent for providing said first query to said join agent and for receiving said determined first characteristic data from said first object agents via said join agent.

23. The method of claim 22 further comprising the step of:
   using characteristic determining data and methods for determining said first characteristic data by encapsulating said characteristic determining data and methods in order to hide said characteristic determining data and methods.

24. The method of claim 22 further comprising the step of:
   using a computer-implemented agent which has its own process thread and contains characteristic determining data and methods for determining said first characteristic data, said first agent encapsulating said characteristic determining data and methods in order to hide said characteristic determining data and methods.

25. The method of claim 22 wherein said ontology of questions includes queries being selected from the group consisting of design intent queries, physical specification queries, static physical response queries, dynamic physical response queries, economic characteristic queries, and combinations thereof.

26. The method of claim 25 wherein said ontology of questions includes the permissible format of the queries.

27. The method of claim 22 further comprising the steps of:
   receiving a second query via said network,
   structuring a response whose format and content is compatible with said query ontological data structure; and
   determining based upon said second query second characteristic data regarding a second characteristic of said physical object,
   structuring said determined second characteristic data using said ontology of questions for communicating said determined second characteristic data via said network.

28. The method of claim 27 wherein said characteristic data is indicative of characteristics of said physical object being selected from the group consisting of design intent queries, physical specification queries, static physical response queries, dynamic physical response queries, economic characteristic queries, and combinations thereof.

29. The method of claim 22 further comprising the steps of:
   receiving a second query via said network regarding a second characteristic of said physical object;
   structuring a response to said second query based upon said query ontological data structure; and
   determining said second characteristic data based upon said second query,
   structuring said determined second characteristic data using said ontology of questions for communicating said determined second characteristic data via said network.

30. The method of claim 29 wherein said ontology of questions includes queries being selected from the group consisting of design intent queries, physical specification queries, static physical response queries, dynamic physical response queries, economic characteristic queries, and combinations thereof.

31. The method of claim 22 wherein said first characteristic data is indicative of characteristics of said physical object being selected from the group consisting of static physical characteristics, dynamic physical characteristics, economic characteristics, and combinations thereof.

32. The method of claim 22 further comprising the steps of:
   receiving said first query via said network;
   structuring a response to said first query based upon said query ontological data structure;
   determining first characteristic data regarding said first characteristic of said physical object based upon said first query; and
   structuring said first characteristic data based upon said ontology of questions for communicating said first characteristic data as determined by said second object characteristic determinator via said network.

33. The method of claim 32 wherein said characteristic data is indicative of characteristics of said physical object being selected from the group consisting of static physical characteristics, dynamic physical characteristics, economic characteristics, and combinations thereof.

34. The method of claim 22 further comprising the step of:
   communicating characteristic data over a global communication network with common protocols.

35. The method of claim 34 further comprising the step of:
   communicating characteristic data via said internet.

36. The method of claim 22 wherein said first query includes data indicative of a recipient model agent, said first object characteristic communicator providing said determined first characteristic data only to said recipient model agent.

37. The method of claim 22 further comprising the step of:
   using a database accessible via said network for providing available model agents to determine characteristic data.

38. The method of claim 37 further comprising the steps of:

assembling said first model agent with a second model agent;

said second model agent performing steps (a)–(c):
(a) using a plurality of second object agents for determining second characteristic data based upon said first query;
(b) using at least one join agent for managing the data exchange between second model object agents;
(c) using a second assembler agent connected to said second model agent and to said join agent for providing data from said first model agent to said join agent and for receiving said determined first characteristic data from said object agents via said join agent.

39. The method of claim 38 further comprising the steps of:

using a database accessible via said network for listing available model agents; and selecting said model agent via said database for being assembled with one of said first agents into said first model agent.

40. The method of claim 22 further comprising the step of:

using recursion to determine first characteristic data regarding said first characteristic of said physical object based upon said first query.

* * * * *

UNITED STATES PATENT AND TRADEMARK OFFICE
CERTIFICATE OF CORRECTION

PATENT NO.   : 6,295,535 B1  Page 1 of 1
DATED        : September 25, 2001
INVENTOR(S)  : Clark J. Radcliffe et al.

It is certified that error appears in the above-identified patent and that said Letters Patent is hereby corrected as shown below:

Column 1,
Line 31, "collaborafively" should be -- collaboratively --.

Column 12,
Line 34, "internet" should be -- Internet --.

Column 14,
Line 58, "internet" should be -- Internet --.

Column 16,
Line 7, after "said" insert -- second --. (first occurrence)
Line 8, first occurrence, after first occurrence of "first" insert -- join --.

Signed and Sealed this

Ninth Day of September, 2003

JAMES E. ROGAN
*Director of the United States Patent and Trademark Office*